(12) United States Patent
Lee et al.

(10) Patent No.: US 12,093,554 B2
(45) Date of Patent: Sep. 17, 2024

(54) MEMORY SYSTEM AND OPERATING METHOD OF MEMORY SYSTEM

(71) Applicant: SK hynix Inc., Icheon-si (KR)

(72) Inventors: Jae Gwang Lee, Icheon-si (KR); Hee Chan Shin, Icheon-si (KR); Young Ho Ahn, Icheon-si (KR); Gi Gyun Yoo, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/651,535

(22) Filed: Feb. 17, 2022

(65) Prior Publication Data

US 2023/0103515 A1  Apr. 6, 2023

(30) Foreign Application Priority Data

Oct. 5, 2021  (KR) .......................... 10-2021-0131541

(51) Int. Cl.
*G06F 3/06* (2006.01)

(52) U.S. Cl.
CPC .......... *G06F 3/0647* (2013.01); *G06F 3/0616* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 5,737,742 A * | 4/1998 | Achiwa | ............... | G06F 12/0246 711/158 |
| 2008/0313505 A1* | 12/2008 | Lee | ..................... | G06F 12/0246 714/E11.004 |
| 2010/0228928 A1* | 9/2010 | Asnaashari | ......... | G06F 12/0246 711/170 |
| 2012/0311244 A1* | 12/2012 | Huang | ................ | G11C 11/5628 711/E12.008 |
| 2014/0281179 A1* | 9/2014 | Post | .................... | G06F 12/0246 711/103 |
| 2015/0043277 A1* | 2/2015 | Fitzpatrick | .......... | G11C 11/5635 365/185.11 |
| 2020/0110545 A1* | 4/2020 | Choi | .................... | G06F 3/0679 |

FOREIGN PATENT DOCUMENTS

| | | |
|---|---|---|
| KR | 100974215 B1 | 8/2010 |
| KR | 20160150451 A | 12/2016 |
| KR | 20200068944 A | 6/2020 |

* cited by examiner

*Primary Examiner* — Michael Alsip

(74) *Attorney, Agent, or Firm* — Perkins Coie LLP

(57) ABSTRACT

Embodiments of the present disclosure relate to a memory system and an operating method of the memory system. In one aspect, a memory system is provided to comprise a memory device including a plurality of memory dies, each memory die including a plurality of memory blocks for storing data and different groups of memory blocks form one or more super blocks; and a memory controller in communication with the memory device and configured to count the number of super blocks in an erase state included in each memory die to identify a first memory die having the smallest number of super blocks in the erase state and a second memory die having the largest number of super blocks in the erase state, and move data stored in a first super block included in the first memory die to a second super block included in the second memory die.

17 Claims, 17 Drawing Sheets

FIG.5
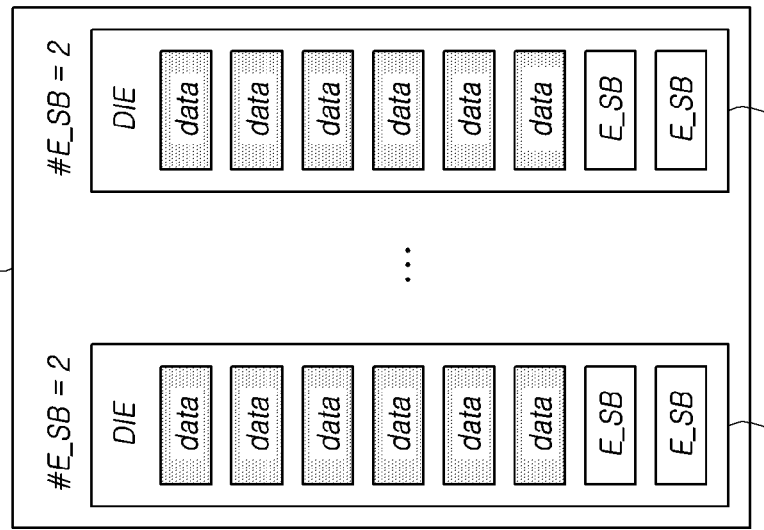
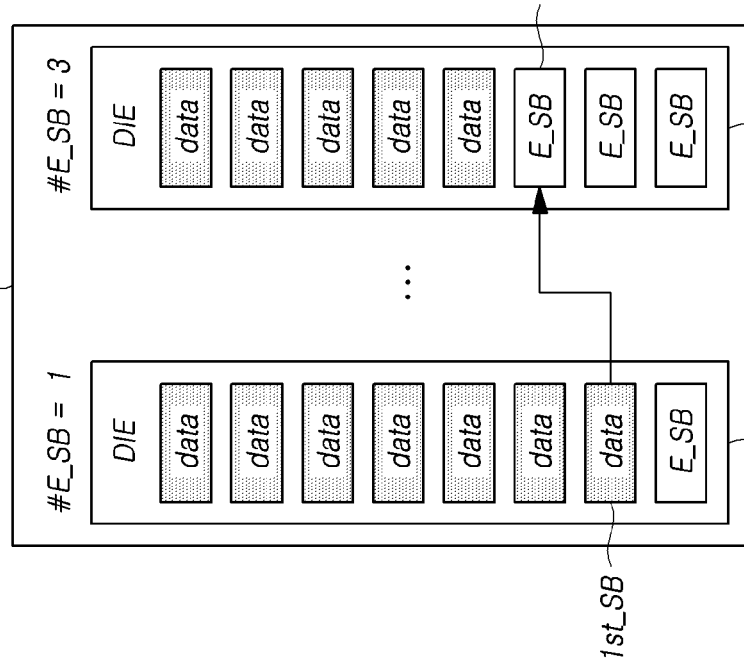

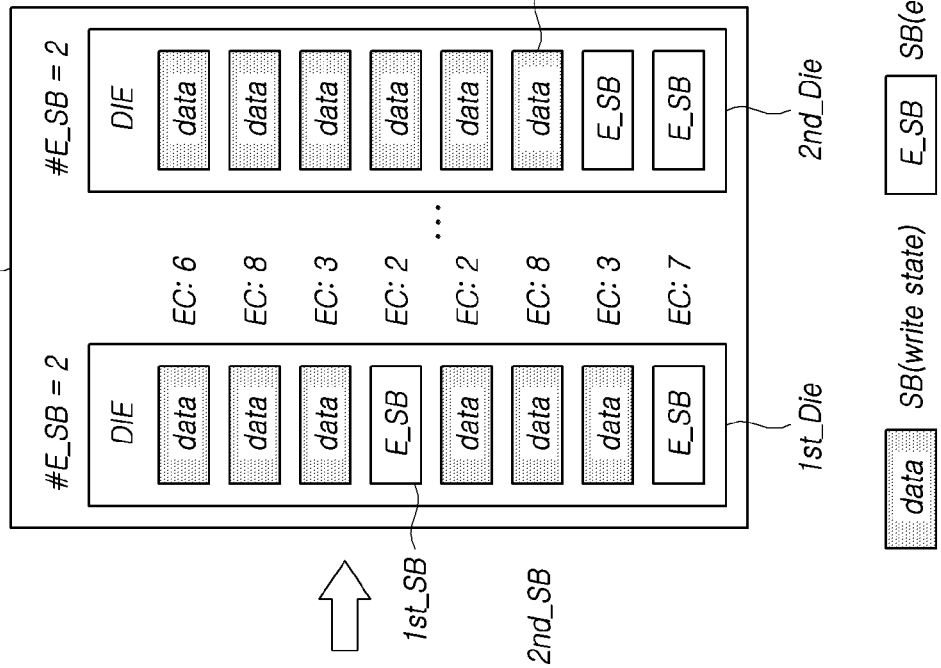
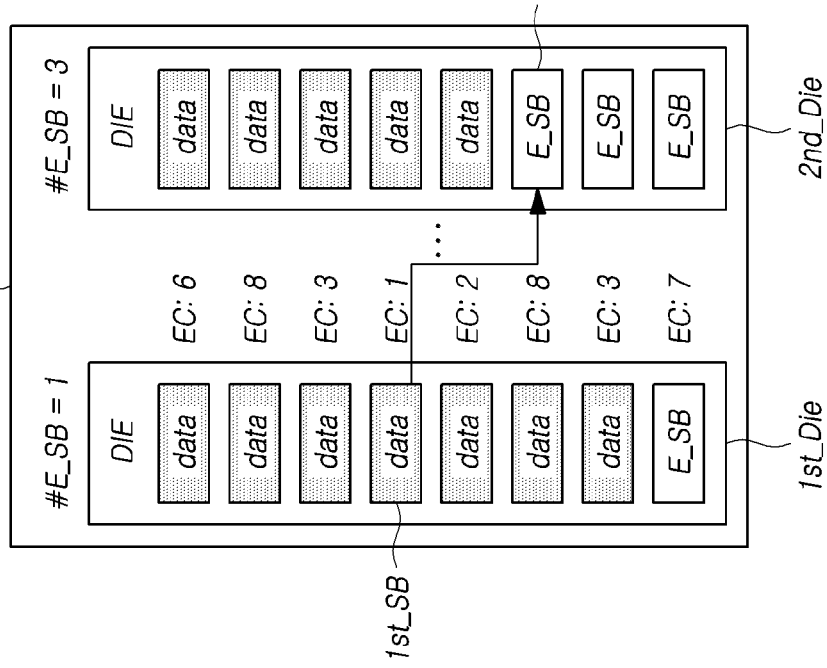
FIG.6

MEMORY SYSTEM AND OPERATING METHOD OF MEMORY SYSTEM

CROSS-REFERENCE TO RELATED APPLICATION

This patent document claims the priority and benefits of Korean patent application number 10-2021-0131541 filed on Oct. 5, 2021, which is incorporated herein by reference in its entirety.

TECHNICAL FIELD

Various embodiments of the disclosed technology generally relate to a memory system and an operating method of the memory system.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

The memory system may perform a wear leveling operation for leveling the degree of wear of the memory device in order to extend the lifespan of the memory system.

SUMMARY

Embodiments of the disclosed technology may provide a memory system and an operating method of the memory system capable of distributing data among memory dies included in a memory device and preventing data from being intensively stored on a specific memory die included in the memory device.

In one aspect, a memory system including a memory device including a plurality of memory dies, each of the plurality of memory dies including a plurality of memory blocks for storing data and different groups of memory blocks form one or more super blocks, and a memory controller. The memory controller may be in communication with the memory device and configured to count the number of super blocks in an erase state included in each memory die to identify a first memory die having the smallest number of super blocks in the erase state and a second memory die having the largest number of super blocks in the erase state, and move data stored in a first super block included in the first memory die to a second super block included in the second memory die.

In another aspect, an operating method of a memory system is provided. The method includes: counting the number of super blocks in an erase state included in each memory die to identify a first memory die having the smallest number of super blocks in the erase state and a second memory die having the largest number of super blocks in the erase state; and moving data stored in a first super block included in the first memory die to a second super block included in the second memory die.

According to embodiments of the present disclosure, it is possible to extend the lifespan of the memory system by enabling data to be distributed and stored in a plurality of memory dies included in the memory device.

BRIEF DESCRIPTION OF THE DRAWINGS

FIG. 5 illustrates an example of a schematic operation of a memory system according to embodiments of the disclosed technology.

FIG. 6 illustrates an example of moving data in a memory system according to embodiments of the disclosed technology.

DETAILED DESCRIPTION

Figure 1:
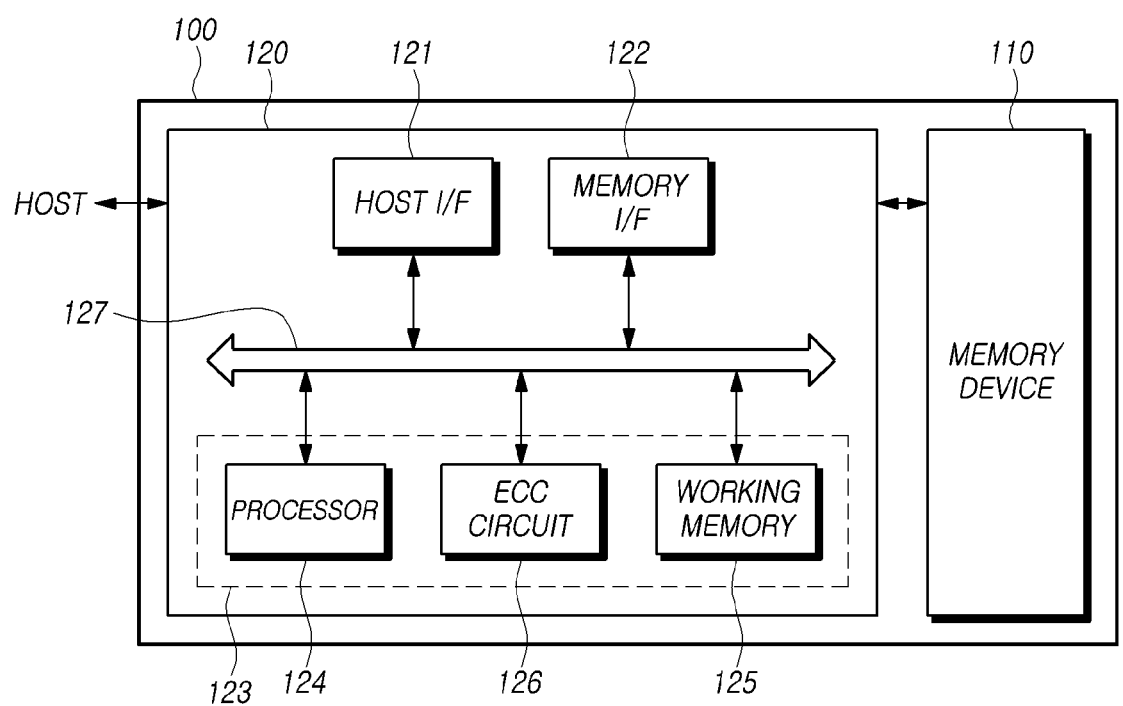
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the disclosed technology are described below in more detail with reference to the accompanying drawings. We note that the disclosed technology may be embodied in different forms and variations, and should not be construed as being limited to the embodiments set forth herein. Throughout the disclosure, like reference numerals refer to like parts throughout the various figures and embodiments of the disclosed technology.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, or others.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
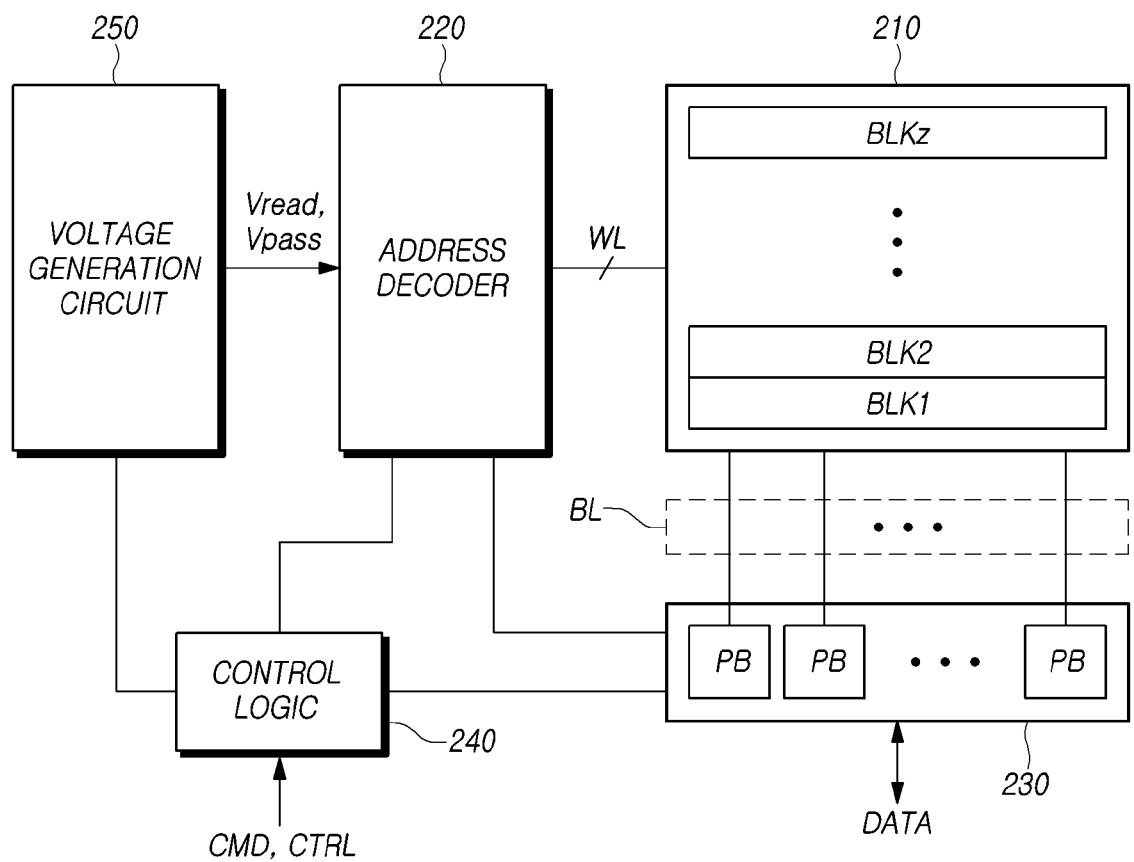
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a material layer that can hold an electrical charge.

For example, the transistor TR arranged in each memory cell MC may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
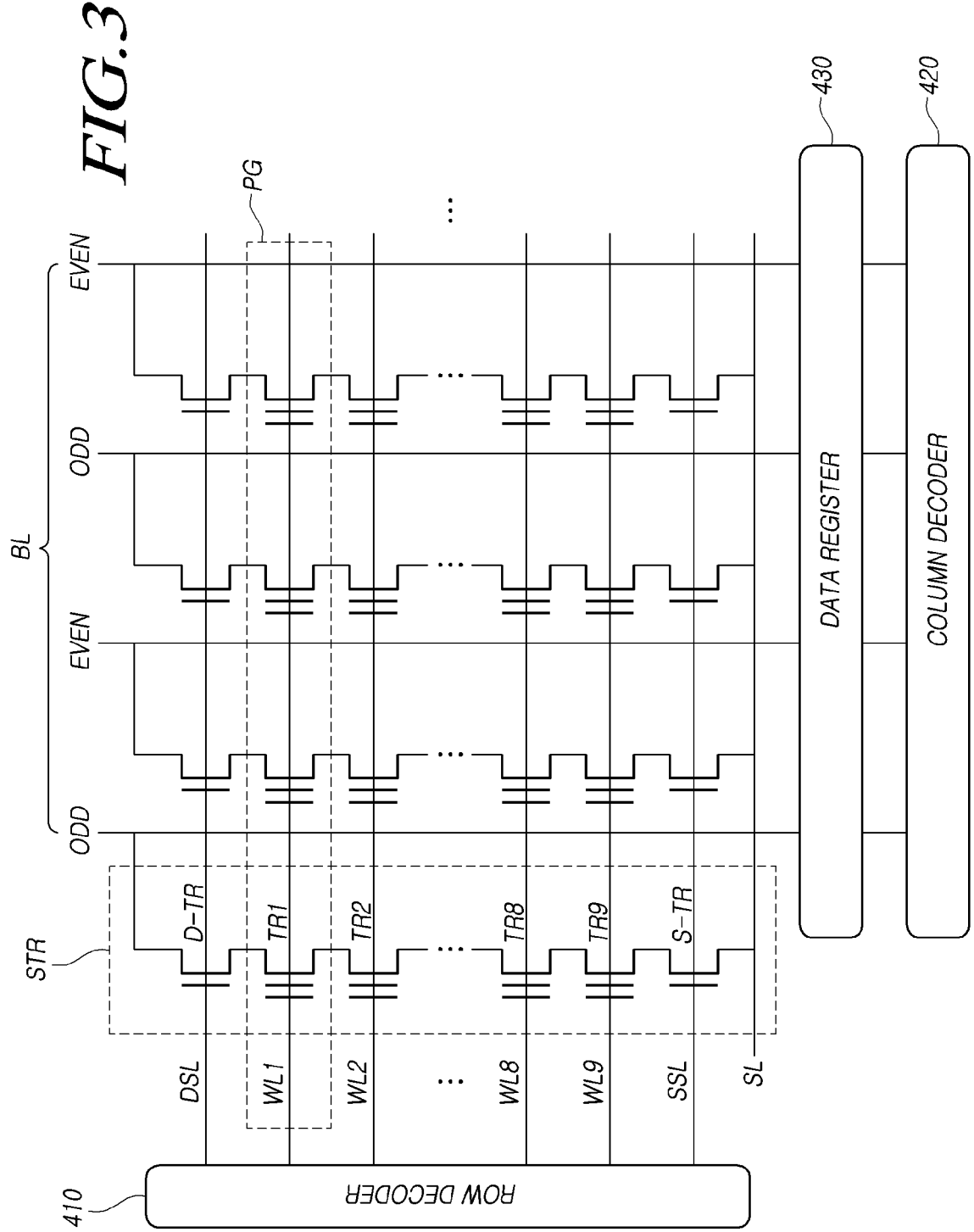
FIG. 3 illustrates a structure of word lines and bit lines of a memory device based on an embodiment of the disclosed technology.

FIG. 3 is a diagram illustrating a structure of word lines WL and bit lines BL of a memory device 110 based on an embodiment of the disclosed technology.

Referring to FIG. 3, the memory device 110 has a core area in which memory cells MC are arranged, and an auxiliary area (the remaining area other than the core area) to include circuitry that is used to perform the operations of the memory cell array 210.

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which corresponds to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, the data register 330 plays an important role because all data processing by the memory device 110, including program and read operations, occurs via the data register 330. If data processing by the data register 330 is delayed, all of the other areas need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
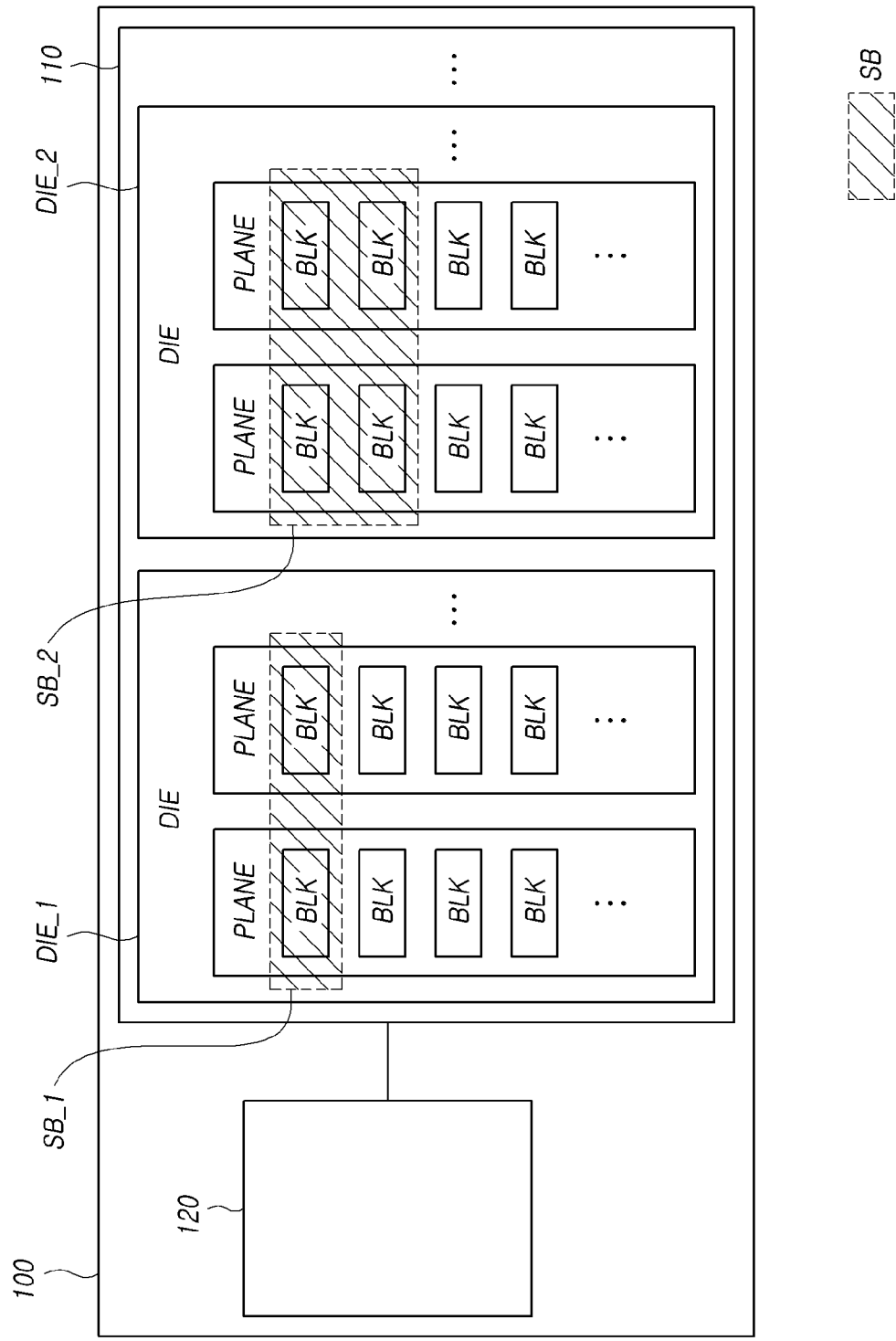
FIG. 4 illustrates an example of a schematic structure of a memory system according to embodiments of the disclosed technology.

FIG. 4 illustrates a schematic structure of a memory system 100 according to embodiments of the disclosure technology.

Referring to FIG. 4, a memory system 100 may include a memory device 110 and a memory controller 120.

The memory device 110 may include a plurality of memory dies DIE. Each of the plurality of memory dies DIE may include a plurality of memory blocks BLK.

Meanwhile, each of the plurality of memory dies DIE, for example, may include a plurality of memory blocks BLK in a manner that each of one or more planes PLANE included in each of the plurality of memory dies DIE includes one or more memory blocks BLK.

The memory controller 120 of the memory system 100 may group a plurality of memory blocks BLK included in each memory die DIE into one or more super blocks SB.

The super block SB is a unit in which a plurality of memory blocks BLK included in the memory device 110 are logically grouped. The memory controller 120 may control the memory device 110 to perform an erase operation in units of super blocks SB.

In FIG. 4, the super block SB_1 includes two memory blocks BLK included in the memory die DIE_1. In this case, the two memory blocks BLK of the super block SB_1 may be included in different planes PLANE of the memory die DIE_1. It is also possible that the super block SB_1 includes memory blocks that are included in a same plane PLANE of the memory die 1.

In addition, the super block SB_2 may include four memory blocks BLK included in the memory die DIE_2. In this case, the four memory blocks BLK of the super block SB_2 may be included in two different planes PLANE of in the memory die DIE_2. Two memory blocks BLK of the super block SB2 are included in a same plane of the memory die DIE 2.

FIG. 5 illustrates a schematic operation of a memory system 100 according to embodiments of the disclosed technology.

Referring to FIG. 5, the memory controller 120 of the memory system 100 may count the number of super blocks E_SB in an erase state among the super blocks SB included in the plurality of memory dies DIE included in the memory device 110.

A super block E_SB in the erase state refers to a super block SB from which data has been erased. Thus, the super block E_SB in the erase state does not store valid data.

The memory controller 120 of the memory system 100 may move data stored in a first super block 1st_SB included in a first memory die 1st_DIE having the smallest number of super blocks E_SB in the erase state among the plurality of memory dies DIE to a second super block 2nd_SB included in a second memory die 2nd_DIE having the largest number of super blocks E_SB in the erase state among the plurality of memory dies DIE.

In FIG. 5, the first memory die 1st_Die has the smallest number of super blocks E_SB in the erase state, which is 1, and the second memory die 2nd Die has the largest number of super blocks E_SB in the erase state, which is 3.

The memory controller 120 may determine one of the super blocks SB included in the first memory die 1st_Die as the first super block 1st_SB. Also, the memory controller 120 may determine one of the super blocks SB included in the second memory die 2nd_Die as the second super block 2nd_SB.

The memory controller 120 may move data stored in the first super block 1st_SB to the second super block 2nd_SB. In the case that the data stored in the first super block 1st_SB is moved to the second super block 2nd_SB, the first super block 1st_SB may become a super block E_SB in the erase state, and the second super block 2nd_SB may become a super block in a write state in which data is written.

The reason why the memory controller 120 performs the above-described operation is discussed as follows.

As an erase operation is performed, the memory blocks included in the memory device 110 may degrade. Accordingly, there is a limit to the number of times that each of the plurality of memory blocks BLK included in the memory device 110 can be erased.

In order to ensure the reliability of data stored in the memory device 110 and extend the life of the memory system 100, the memory controller 120 may perform a certain operation for prolonging the life of the memory device. For example, the memory controller 120 may perform a wear leveling operation may be performed for leveling the wear level of the memory blocks included in the memory device 110.

In the case that the memory device 110 includes a plurality of memory dies DIE, in order to prevent a lifespan of a specific memory die among the plurality of memory dies DIE from being shortened, the memory controller 120 may distribute and store data among the plurality of memory dies DIE.

If data is intensively written to a specific memory die among the plurality of memory dies DIE and the super block E_SB in the erase state included in the corresponding memory die is exhausted, the memory controller 120 may have difficulties in distributing and storing data among the plurality of memory dies DIE. Accordingly, the lifespan of a specific memory die is shortened, which results in shortening of the lifespan of the memory system 100.

Therefore, the memory controller 120 may move data stored in the first super block 1st_SB included in a first memory die 1st_DIE having the smallest number of super blocks E_SB in the erase state among the plurality of memory dies DIE to the second super block 2nd_SB included in a second memory die 2nd_DIE having the largest number of super blocks E_SB in the erase state among the plurality of memory dies DIE, thereby increasing the number of the super blocks E_SB in the erase state included in the first memory die 1st_Die.

Accordingly, the memory controller 120 may prevent a situation that distributing and storing data among the plurality of memory dies DIE is limited due to an exhaust of the super block E_SB in the erase state in a specific memory die. As a result, the memory controller 120 can extend the lifespan of the memory system 100.

FIG. 6 illustrates an example of moving data in a memory system 100 according to embodiments of the disclosed technology.

Referring to FIG. 6, the memory controller 120 of the memory system 100 may determine the first super block 1st_SB as a super block SB having the smallest erase count EC among super blocks SB in a write state included in the first memory die 1st_DIE.

A super block in a write state means a super block in which valid data is stored.

The memory controller 120 may count the erase count EC, which is the number of times an erase operation has occurred, for each super block SB.

In FIG. 6, the memory controller 120 may determine a super block SB having the smallest erase count EC from among super blocks SB in the write state included in the first memory die 1st_Die to the first super block 1st_SB, and may move data stored in the first super block 1st_SB to the second super block 2nd_SB included in the second memory die 2nd_Die. How the second super block is selected among the memory blocks in the second memory die 2nd_Die will be explained with reference to FIG. 7.

Thereafter, the memory controller 120 may perform an erase operation on the first super block 1st_SB. The first super block 1st_SB in the erase state may be used by the memory controller 120 to write new data again.

For example, the erase counts EC of the super blocks SB included in the first memory die 1st_Die of FIG. 6 are 6, 8, 3, 1, 2, 8, 3, and 7, respectively.

In this case, the memory controller 120 may determine the super block having the smallest erase count EC of 1 among the super blocks SB in the write state included in the first memory die 1st_Die as the first super block 1st_SB.

The memory controller 120 may move data stored in the first super block 1st_SB having the erase count EC of 1 to the second super block 2nd_SB of the second memory die 2nd_Die. Thereafter, the memory controller 120 may erase data stored in the first super block 1st_SB to makes the first super block 1st_SB to a super block E_SB in the erase state, and then may increase the erase count EC of the first super block 1st_SB from 1 to 2.

As described above, the memory controller 120 may change the super block having the lowest erase count EC among the super blocks in the write state to the erase state so as to reuse the corresponding super block. Accordingly, the memory controller 120 can evenly maintain the erase counts EC of the super blocks SB included in the plurality of memory dies DIE of the memory device 110, which results in preventing from the shortening of the lifespan of the memory system 100.

Figure 7:
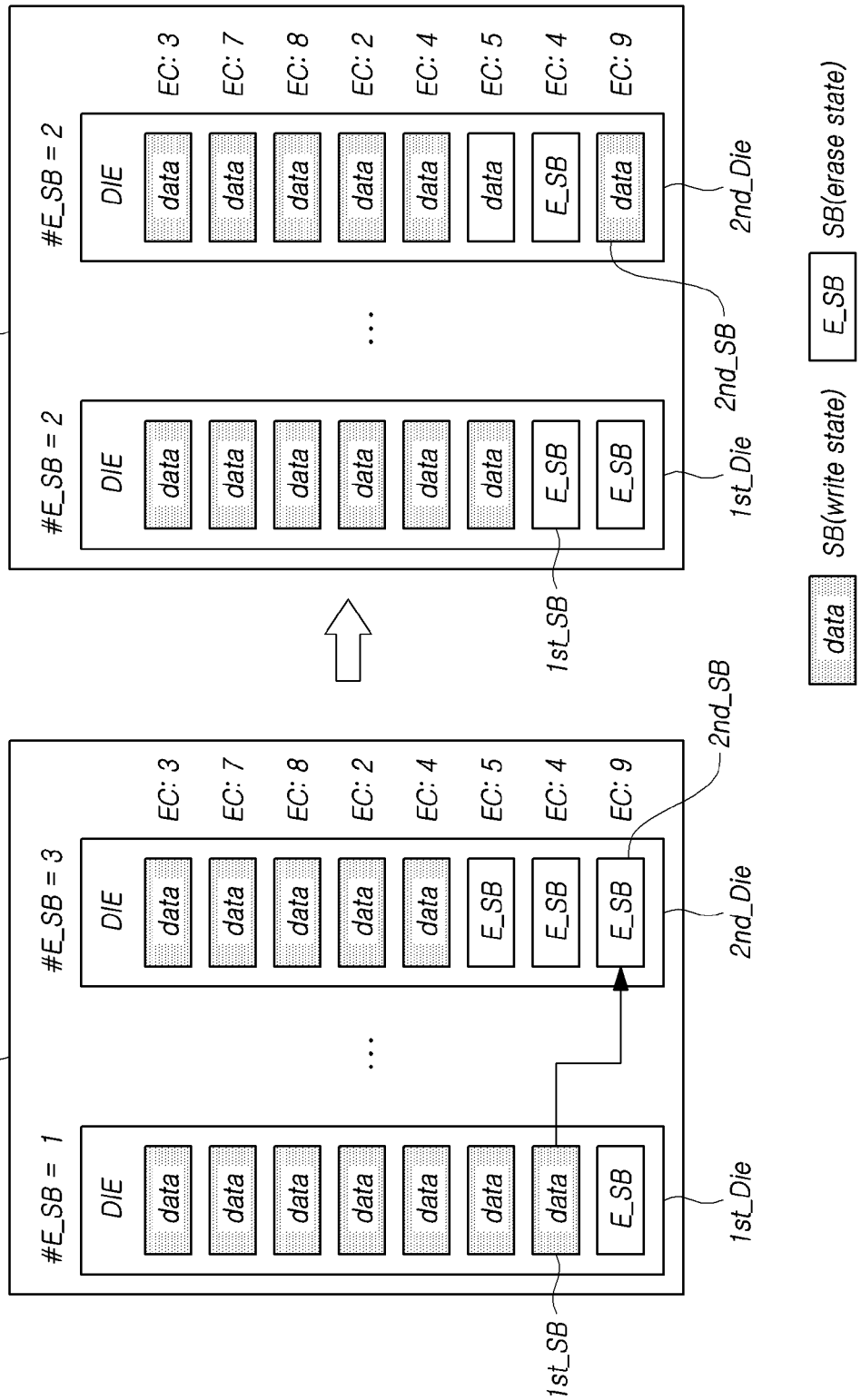
FIG. 7 illustrates another example of moving data in a memory system according to embodiments of the disclosed technology.

FIG. 7 illustrates another example of moving data in a memory system 100 according to embodiments of the disclosed technology.

Referring to FIG. 7, the memory controller 120 of the memory system 100 may determine the second super block 2nd_SB as a super block having the largest erase count EC among the super blocks E_SB in the erase state included in the second memory die 2nd_Die.

In FIG. 7, the memory controller 120 may determine a super block having the largest erase count EC among the super blocks E_SB in the erase state included in the second memory die 2nd_Die as the second super block 2nd_SB, and may change the state of the second super block 2nd_SB from the erase state to the write state by moving the data stored in the first super block 1st_SB to the second super block 2nd_SB.

As an example, in the second memory die 2nd_Die of FIG. 7, the erase count EC of each of the super blocks is 3, 7, 8, 2, 4, 5, 4, 9, respectively.

In this case, the memory controller 120 may confirm that the erase count EC of the super block having the largest erase count EC among the super blocks E_SB in the erase state is 9.

The memory controller 120 may determine the super block SB having the largest erase count EC of 9 among the super blocks E_SB in the erase state included in the second memory die 2nd_Die as the second super block 2nd_SB, and may move the data stored in the first super block 1st_SB to the second super block 2nd_SB. In this case, the memory controller 120 may change the state of the second super block 2nd_SB from the erase state to the write state. How the first super block 1st_SB is selected among the memory blocks in the first memory die 1st_Die has been already described with reference to FIG. 6.

The data previously stored in the first super block 1st_SB is more likely to be cold data with a relatively low access frequency compared to data newly requested to be written by a host through a write command.

Accordingly, the memory controller 120 may write the data previously stored in the first super block 1st_SB to the second super block 2nd_SB having a large erase count EC so as to delay updating the erase count EC of the second super block 2nd_SB. This is because the possibility that data is changed when the data is directly stored in the second super block 2nd_SB without being stored in the first super block 1st_SB (e.g., the data corresponds to the data newly requested by the host through the write command) may be higher than the possibility that data is changed when the data is previously stored in the first super block and moved to the second super block 2nd_SB. By moving the data previously stored in the first super block 1st_SB to the second super block 2nd_SB, the second super block 2nd_SB having a large erase count EC can store the data having a relatively low possibility to change. Thus, it is possible to prevent the data in the second super block 2nd_SB from being changed in a relatively short time and delay updating the erase count EC of the second super block 2nd_SB.

Accordingly, the memory controller 120 can prevent a shortening of the lifespan of the memory system 100 by evenly maintaining the erase counts of the super blocks SB included in the memory die DIE.

Figure 8:
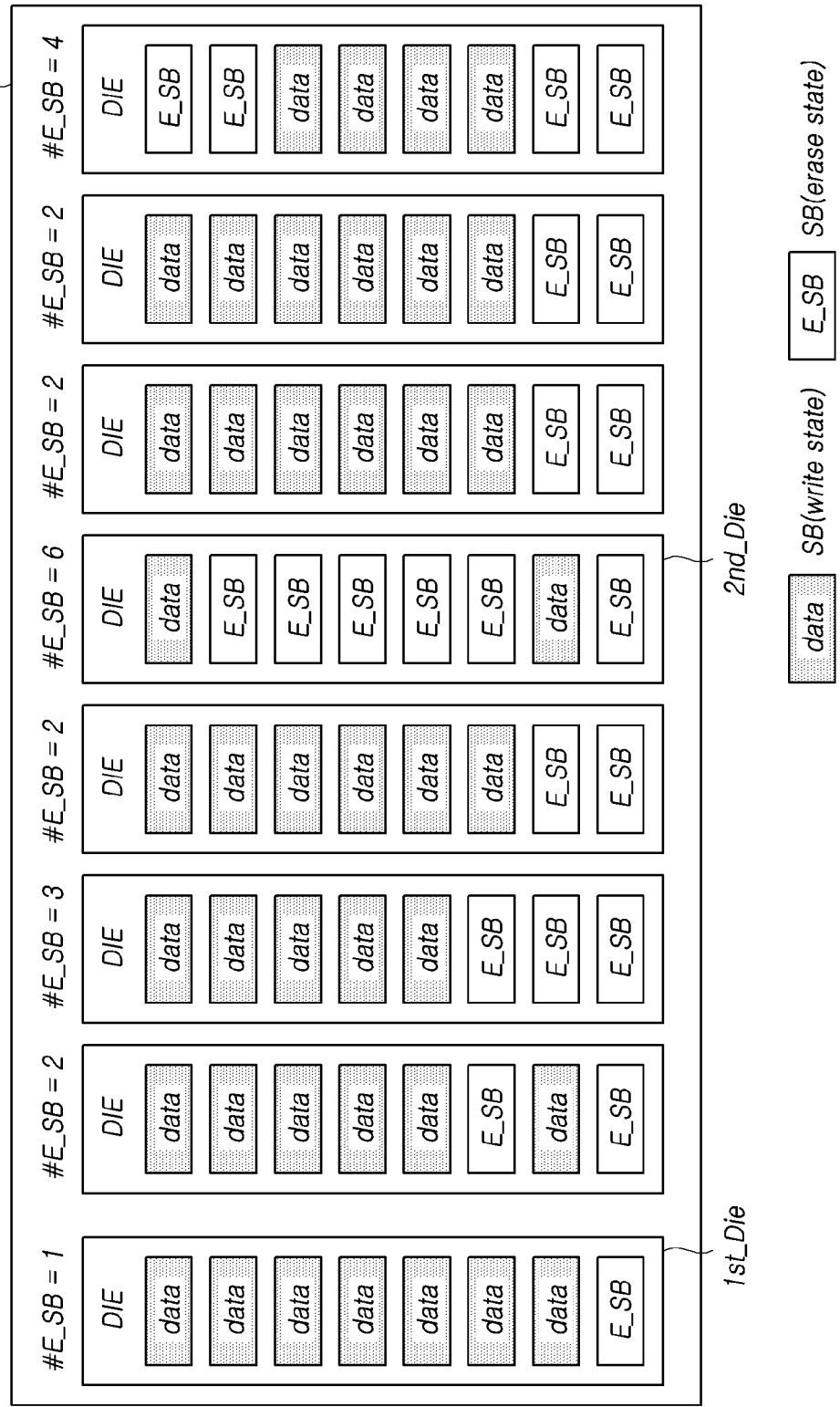
FIG. 8 illustrates an example of super blocks included in a plurality of memory dies of a memory system according to embodiments of the disclosed technology.

FIG. 8 illustrates an example of super blocks SB included in a plurality of memory dies DIE of a memory system 100 according to embodiments of the present disclosure.

Referring to FIG. 8, the memory controller 120 of the memory system 100 may check the number of super blocks E_SB in the erase state included in each of the plurality of memory dies DIE included of the memory device 110.

In FIG. 8, the number of super blocks E_SB in the erase state of each of the memory dies DIE included in the memory device 110 are 1, 2, 3, 2, 6, 2, 2, and 4, respectively.

The memory controller 120 may determine, among the memory dies DIE included in the memory device 110, the memory die having the smallest value of 1 for the number of super blocks E_SB in the erase state as a first memory die 1st_Die.

The memory controller 120 may determine, among the memory dies DIE included in the memory device 110, the memory die DIE having the largest value of 6 for the number of super blocks E_SB in the erase state as a second memory die 2nd_Die.

In FIG. 8, it is assumed that a value of the set threshold THR is 5.

The memory controller 120 may check a difference between the number of super blocks E_SB in the erase state included in the first memory die 1st_Die and the number of super blocks E_SB in the erase state included in the second memory die 2nd_Die is 5, which is equal to or greater than the set threshold THR.

Figure 9:
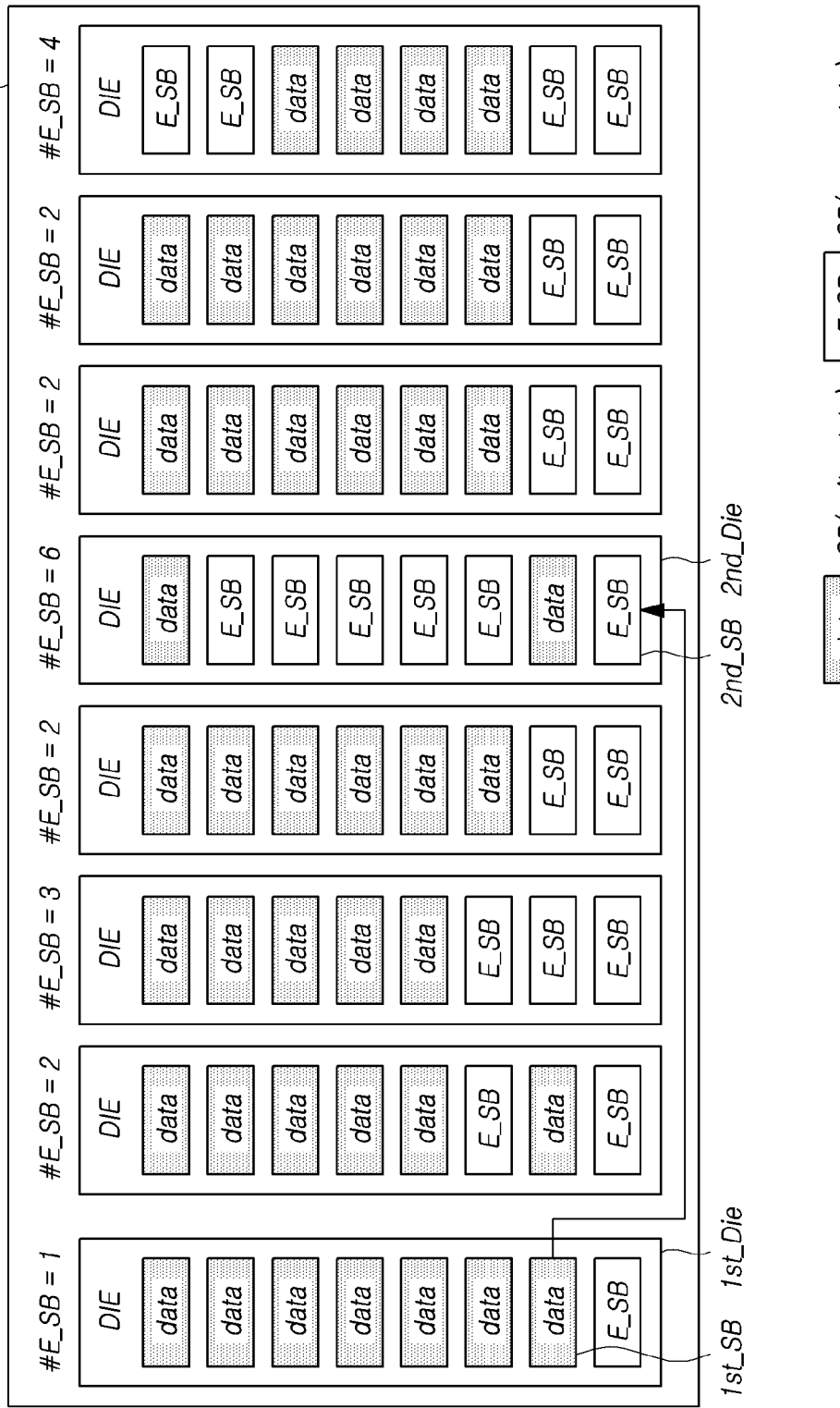
FIG. 9 illustrates an example of an operation of moving data stored in a first super block to a second super block by a memory system according to embodiments of the disclosed technology.

FIG. 9 illustrates an example of an operation of moving data stored in a first super block 1st_SB to a second super block 2nd_SB by a memory system 100 according to embodiments of the present disclosure.

Referring to FIG. 9, when a difference between the number of super blocks E_SB in the erase state included in the first memory die 1st_Die and the number of super blocks E_SB in the erase state included in the second memory die 2nd_Die is equal to or greater than the set threshold THR, the memory controller 120 of the memory system 100 can move the data stored in the first super block 1st_SB to the second super block 2nd_SB.

For example, the memory controller 120 may determine the first super block 1st_SB so that the number of the super blocks E_SB in the erase state included in the plurality of memory dies DIE becomes as even as possible by considering the erase count EC of the super blocks SB included in the first memory die 1st_Die, states of the memory blocks included in the super blocks SB in the first memory die 1st_Die, or others.

In addition, the memory controller 120 may determine the second super block 2nd_SB corresponding to the first super block 1st_SB among the super blocks E_SB in the erase state of the second memory die 2nd_Die. In this case, the memory controller 120 may determine the second super block 2nd_SB so that the super blocks SB included in the second memory die 2nd_Die can be used as uniformly or evenly as possible by considering the erase count EC of the super blocks SB included in the second memory die 2nd_Die, states of the memory blocks included in the super blocks SB in the second memory die 2nd_Die, or others.

In FIG. 9, the memory controller 120 may move data stored in the first super block 1st_SB to the second super block 2nd_SB.

Figure 10:
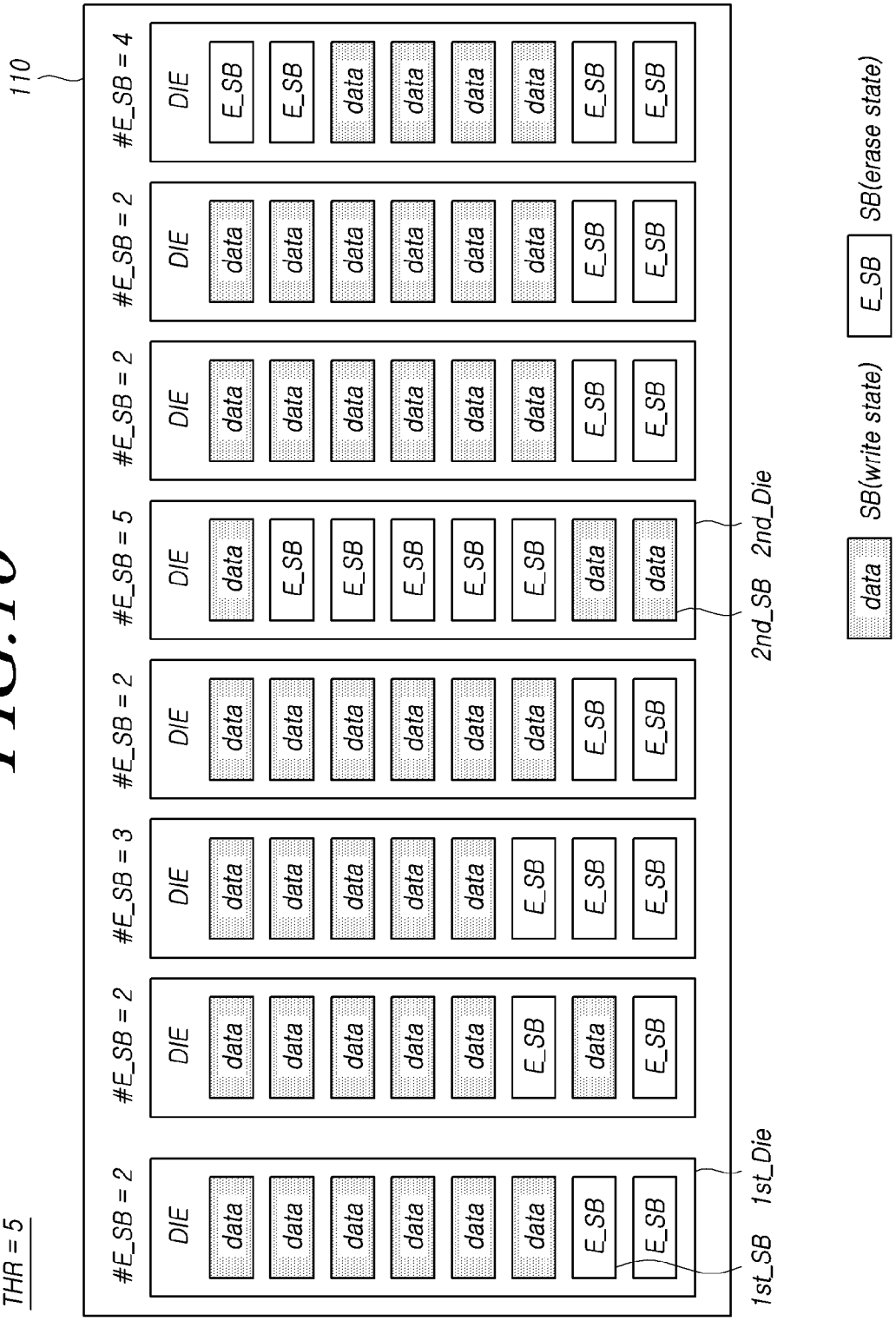
FIG. 10 illustrates an example of a state after a memory system moves data stored in a first super block to a second super block according to embodiments of the disclosed technology.

FIG. 10 illustrates an example of a state after a memory system 100 moves data stored in a first super block 1st_SB to a second super block 2nd_SB according to embodiments of the disclosed technology.

Referring to FIG. 10, after the memory controller 120 moves the data stored in the first super block 1st_SB to the second super block 2nd_SB, it can be confirmed that the first memory die 1st_Die includes two super blocks E_SB in an erase state, and the second memory die 2nd_Die includes five super blocks E_SB in an erase state. As compared to FIG. 8, it can be seen that the difference between the number of super blocks E_SB in the erase state included in the first memory die 1st_Die and the number of super blocks E_SB in the erase state included in the second memory die 2nd_Die has decreased.

Figure 11:
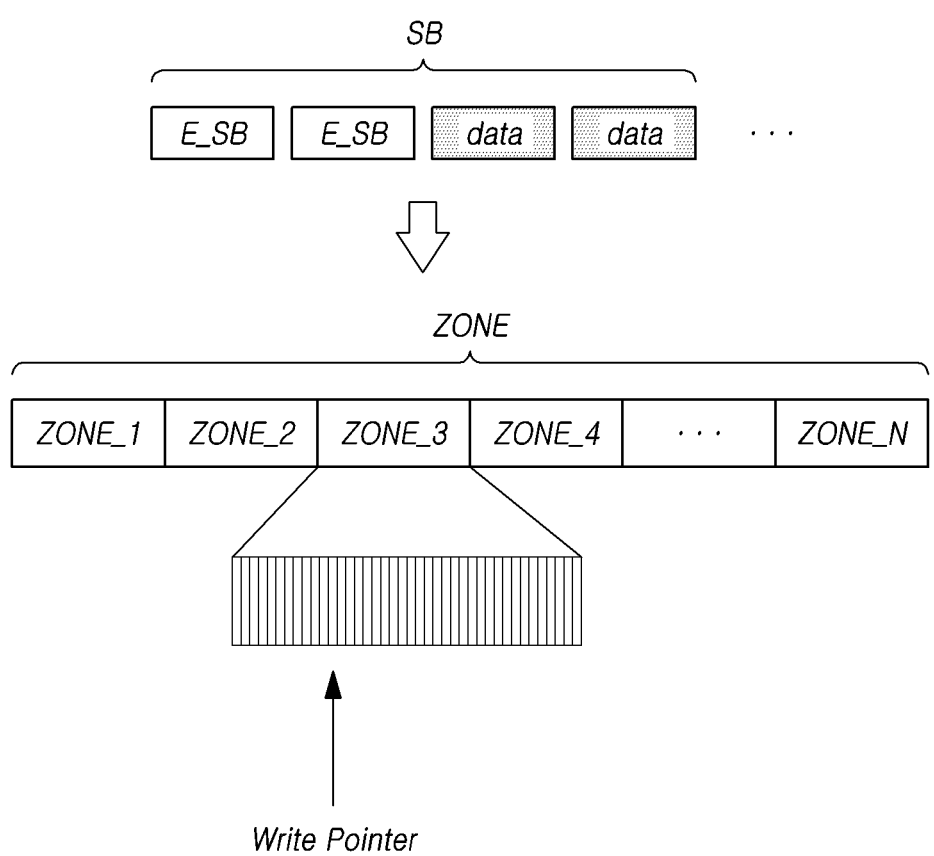
FIG. 11 illustrates a plurality of zones of a memory system according to embodiments of the disclosed technology.

FIG. 11 illustrates a plurality of zones ZONE of a memory system 100 according to embodiments of the disclosed technology.

Referring to FIG. 11, the memory controller 120 of the memory system 100 may allocate the super blocks SB included in the plurality of memory dies DIE included in the memory device 110 to a plurality of zones ZONE.

In embodiments of the disclosed technology, there may be applied a zoned namespace to the memory system 100.

The zoned namespace refers to a division of the memory device 110 into a plurality of zones corresponding to areas indicated by logical addresses. When storing data in each of the plurality of zones, the memory controller 120 may store data while sequentially increasing logical addresses. Accordingly, data having a similar property or characteristics may be stored in one zone.

The memory controller 120 may perform an erase operation in units of the zone ZONE. In the case that the zoned namespace is applied, the memory controller 120 may not perform a separate garbage collection operation. The garbage collection operation is performed as the background operation by the memory controller 120, and additional resources are used to execute the garbage collection operation. Thus, due to the garbage collection operation, the operation requested by the host may be delayed due to the garbage collection operation, which can degrade the quality of service.

Since the memory system 100 to which a zoned namespace is applied does not perform a garbage collection operation, it is possible to avoid or prevent a deterioration of the quality of service QoS due to the garbage collection operation.

The zone may have several states. For example, the zone may have an empty state, an offline state, a full state, a read only state, or others. In this case, the corresponding zone ZONE may be treated as an inactive zone.

A zone in the empty state does not store data, and a write pointer indicating a logical address to which data is to be written indicates a first logical address of the corresponding zone. In order to write data in the corresponding zone, it is required to change from an empty state to an open state.

A zone in a full state means a state in which all data is stored in the corresponding zone. In this case, the write pointer indicates the last logical address of the corresponding zone. Unless the zone is reset and returned to an empty state, data cannot be written in the corresponding zone.

A zone in a read only state may provide the ability for a host HOST to use a zoned namespace as read-only, even after a portion of the capacity stops working.

A zone in the offline state means a state at the end of lifespan, and there cannot occur further state transition.

As another example, the zone ZONE may have an open state or a closed state. In this case, the corresponding zone ZONE may be treated as an activated zone.

Data may be written in a zone in the open state. In this case, the storage medium of the memory device 110 may be mapped to the corresponding zone.

The zone in the closed state is activated, however, the writing of data is temporarily limited. The memory controller 120 may limit the number of zones in the open state for efficient operation of the memory system 100 to which a zoned namespace is applied. In this case, a specific zone in the open state may be changed to a closed state.

Figure 12:
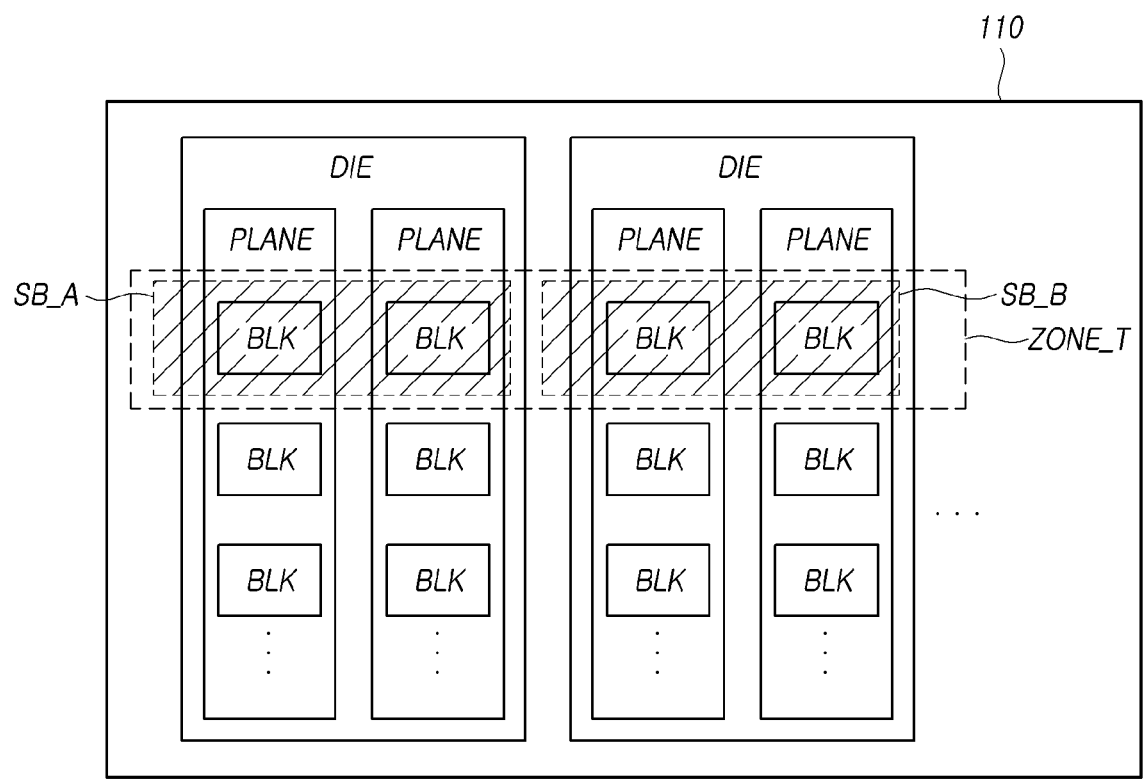
FIG. 12 illustrates an example of allocating a super block to a specific zone by a memory system according to embodiments of the disclosed technology.

FIG. 12 illustrates an example of allocating a super block to a specific zone by a memory system 100 according to embodiments of the disclosed technology.

Referring to FIG. 12, when the memory controller 120 of the memory system 100 activates a specific target zone ZONE_T among the plurality of zones ZONE described above, the memory controller 120 may allocate one or more of the super blocks SB included in the plurality of memory dies DIE to the target zone ZONE_T.

As described above, the memory controller 120 may change the zone ZONE to an open state and activate in order to write data to a zone ZONE in an empty state.

In this case, the memory controller 120 may allocate one or more of the super blocks SB included in the plurality of memory dies DIE according to the capacity of the corresponding zone.

In FIG. 12, a super block SB_A and a super block SB_B are allocated to the target zone ZONE_T.

In the case that data is written to the target zone ZONE_T, the corresponding data may be written to the super block SB_A and the super block SB_B.

Figure 13:
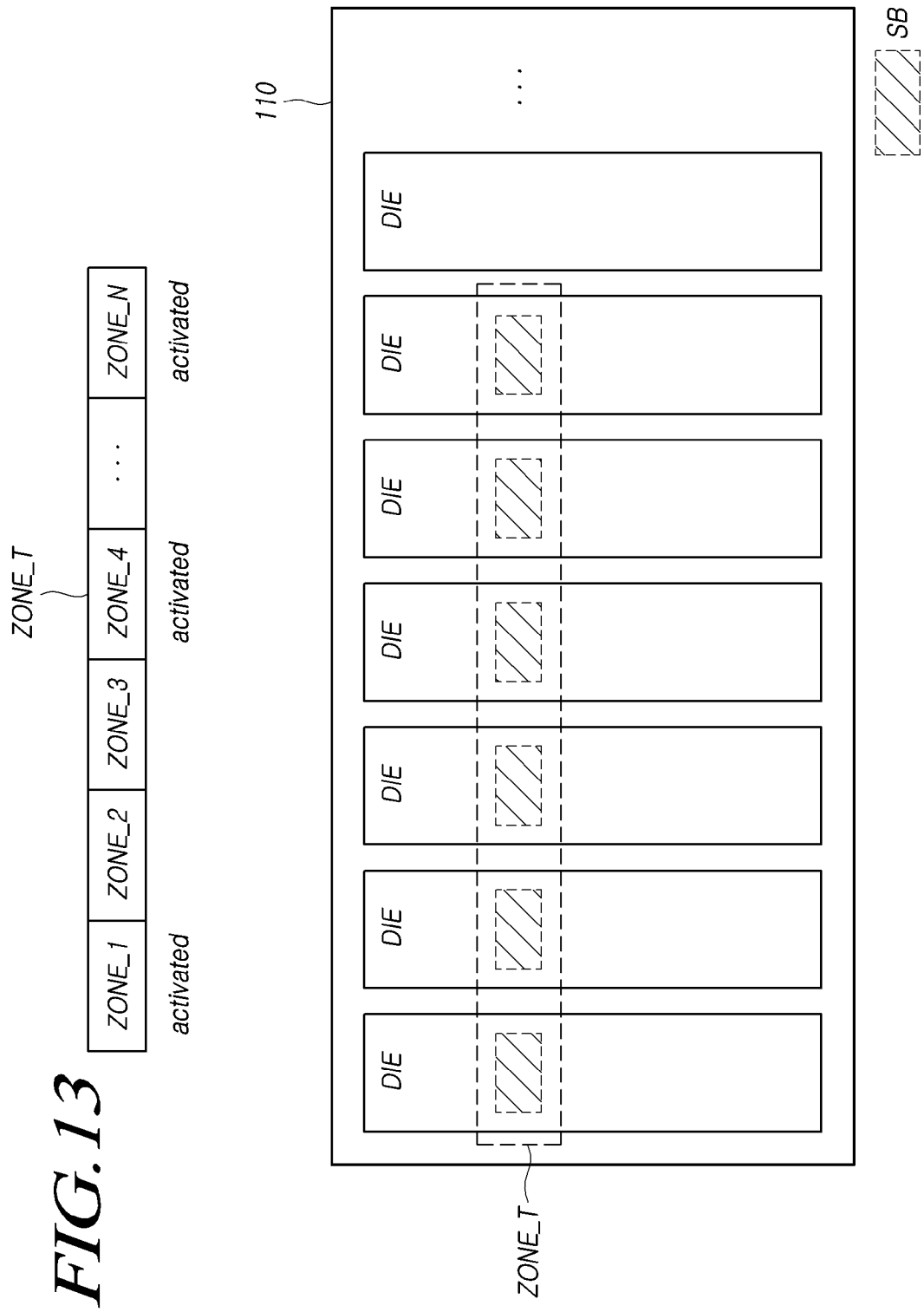
FIG. 13 illustrates an example in which a memory system selects memory dies according to embodiments of the disclosed technology.

FIG. 13 illustrates an example in which a memory system 100 selects the memory dies DIE including the super block to be allocated to the target zone ZONE_T.

Referring to FIG. 13, when allocating one or more of the super blocks SB included in the plurality of memory dies DIE to the target zone ZONE_T, the memory controller 120 of the memory system 100 may select a memory die from among the plurality of memory dies DIE in a round-robin manner.

In FIG. 13, it is assumed that a plurality of zones ZONE_1, ZONE_2, ZONE_3, ZONE_4, . . . , ZONE_N exist, and a first zone ZONE_1, a fourth zone ZONE_4, and a N-th zone ZONE_N are activated. In addition, it is assumed that the fourth zone ZONE_4 is a target zone ZONE_T.

When the memory controller 120 allocates a super block to the target zone ZONE_T, the memory controller 120 may select one memory die DIE in a round-robin manner, and may allocate one or more of the super blocks SB included in the selected memory die to the target zone ZONE_T.

Accordingly, the memory controller 120 can uniformly or evenly utilize the plurality of memory dies DIE included in the memory device 110 when setting the target zone ZONE_T. In addition, the memory controller 120 may equalize the memory dies DIE including the super blocks SB allocated to the target zone ZONE_T, and may concentrate the super blocks SB included in the target zone ZONE_T on a specific memory die. Accordingly, it is possible to prevent a problem that the super block E_SB in the erase state is rapidly exhausted among the super blocks SB included in the target zone ZONE_T.

Furthermore, when setting the target zone ZONE_T, the memory controller 120 can maximize the parallelism of the plurality of memory dies DIE included in the memory device 110. Accordingly, it is possible to increase the read speed and the write speed of the memory system 100.

Figure 14:
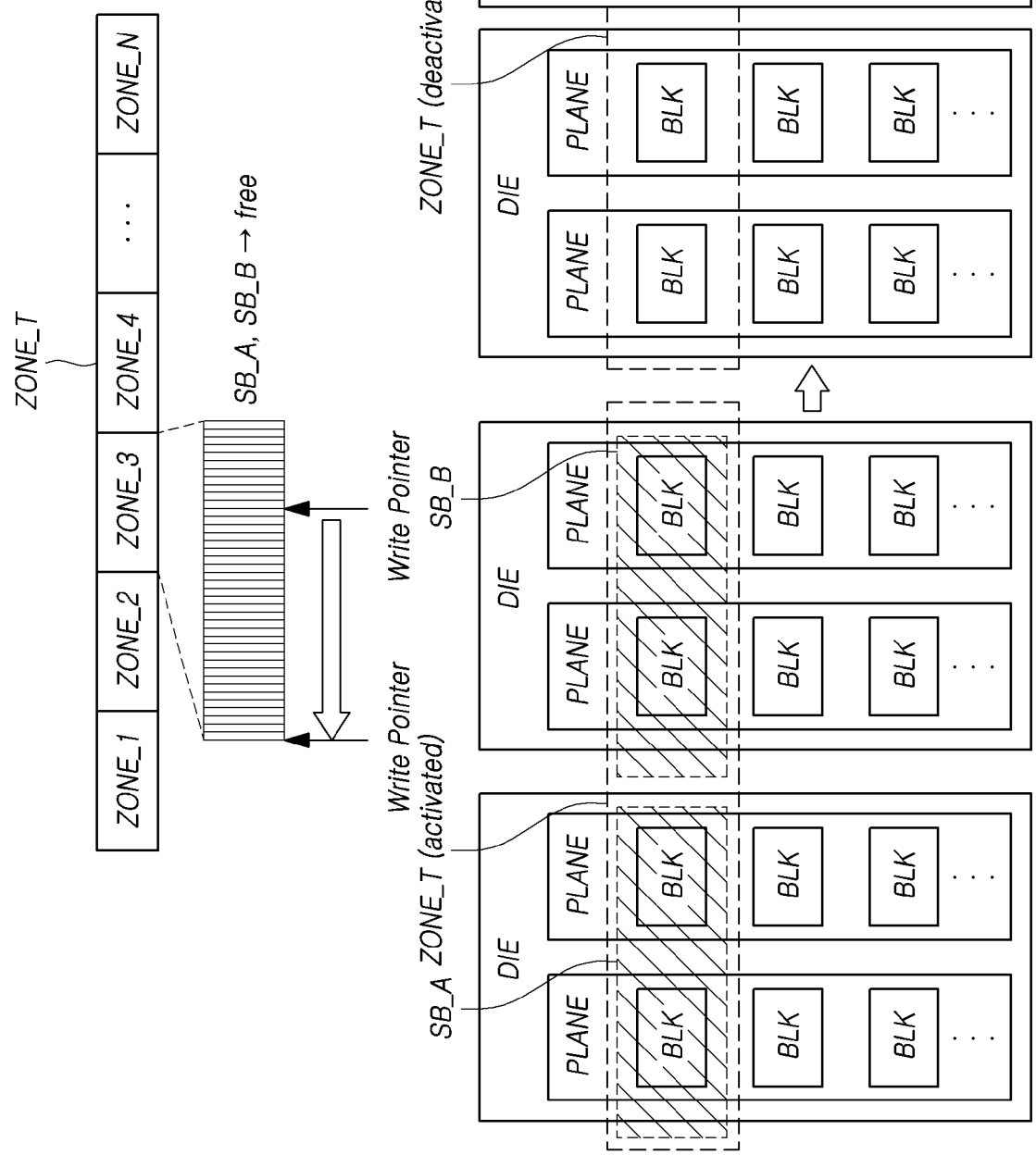
FIG. 14 illustrates an example in which a memory system performs a reset operation of a target zone according to embodiments of the disclosed technology.

FIG. 14 illustrates an example in which a memory system 100 performs a reset operation of a target zone ZONE_T according to embodiments of the disclosed technology.

In FIG. 14, it is assumed that the target zone ZONE_T is the fourth zone ZONE_4 among the plurality of zones ZONE_1, ZONE_2, ZONE_3, ZONE_4, . . . , ZONE_N.

Referring to FIG. 14, when resetting the target zone ZONE_T, the memory controller 120 of the memory system 100 may erase data stored in a super blocks SB allocated to the target zone ZONE_T.

The memory controller 120 may perform an erase operation on the super block SB_A and the super block SB_B allocated to the target zone ZONE_T so as to erase data stored in the super block SB_A and the super block SB_B. In this case, the super block SB_A and the super block SB_B may be changed to an erase state.

In addition, the memory controller 120 may release the super block SB_A and the super block SB_B, which are the super blocks SB allocated to the target zone ZONE_T.

The memory controller 120 may release the super block SB_A and the super block SB_B allocated to the target zone ZONE_T, and thereafter, when a zone different from the target zone ZONE_T is activated among the plurality of zones ZONE_1, ZONE_2, ZONE_3, ZONE_4, . . . , ZONE_N, the controller may allocate the released super block SB_A and the super block SB_B to another activated zone.

Further, the memory controller 120 may deactivate the target zone ZONE_T.

When resetting the target zone ZONE_T, the memory controller 120 may return a write pointer for the target zone ZONE_T to the starting point of the logical address of the target zone ZONE-T. In this case, the memory controller 120 may change the state of the target zone ZONE_T to an empty state to deactivate.

Figure 15:
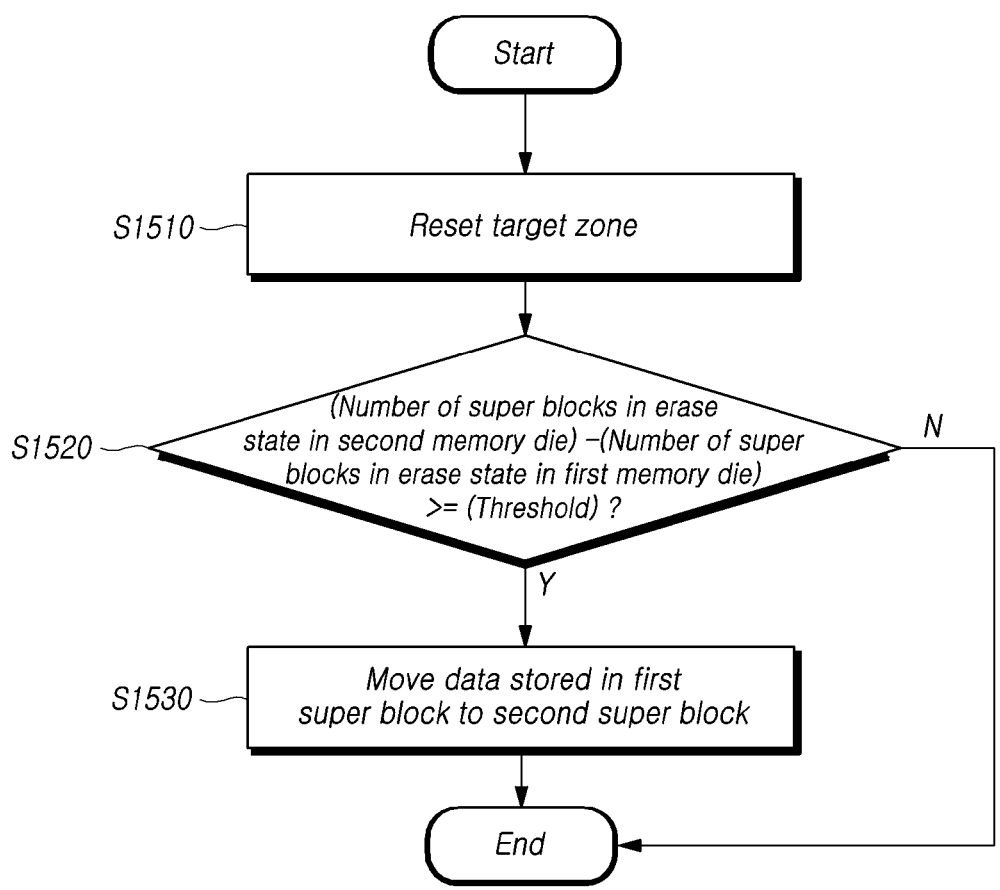
FIG. 15 is a flowchart illustrating an example of an operation of moving data after resetting a target zone by a memory system according to embodiments of the disclosed technology.

FIG. 15 is a flowchart illustrating an example of an operation of moving data after resetting a target zone ZONE_T by a memory system 100 according to embodiments of the disclosed technology.

Referring to FIG. 15, after resetting the target zone ZONE_T, the memory controller 120 may determine whether there is an imbalance in the number of super blocks SB in the erase state among the plurality of memory dies DIE included in the memory device 110, and, if necessary, may execute an operation of moving data between the plurality of memory dies DIE.

As described above, when the memory controller 120 resets the target zone ZONE_T, the super blocks SB allocated to the target zone ZONE_T may be changed to an erase state. Accordingly, for a memory die including one or more of the super blocks SB changed to the erase state, there may be changed the number of super blocks SB in the erase state included in the corresponding memory die. Accordingly, there may generate an imbalance in the number of super blocks SB in an erase state among the plurality of memory dies DIE included in the memory device 110.

In FIG. 15, the memory controller 120 may reset the target zone ZONE_T (S1510).

In addition, the memory controller 120 may determine whether a difference between the number of super blocks in the erase state included in the first memory die 1st_Die and the number of super blocks in the erase state included in the second memory die 2nd_Die is equal to or greater than a set threshold THR (S1520).

If the difference between the number of super blocks in the erase state included in the first memory die 1st_Die and the number of super blocks in the erase state included in the second memory die 2nd_Die is greater than or equal to the set threshold THR (S1520—Y), the memory controller 120 may move the data stored in the first super block 1st_SB to the second super block 2nd_SB (S1530).

If the difference between the number of super blocks in the erase state included in the first memory die 1st_Die and the number of super blocks in the erase state included in the second memory die 2nd_Die is less than the threshold THR (S1520—N), the memory controller 120 may terminate the procedure without moving the data since data movement is not required.

As described above, the memory controller 120 may monitor, when the target zone ZONE_T is reset, the difference between the number of super blocks in the erase state included in the first memory die 1st_Die and the number of super blocks in the erase state included in the second memory die 2nd_Die, so that the memory controller 120 may efficiently operate the memory system 100.

Figure 16:
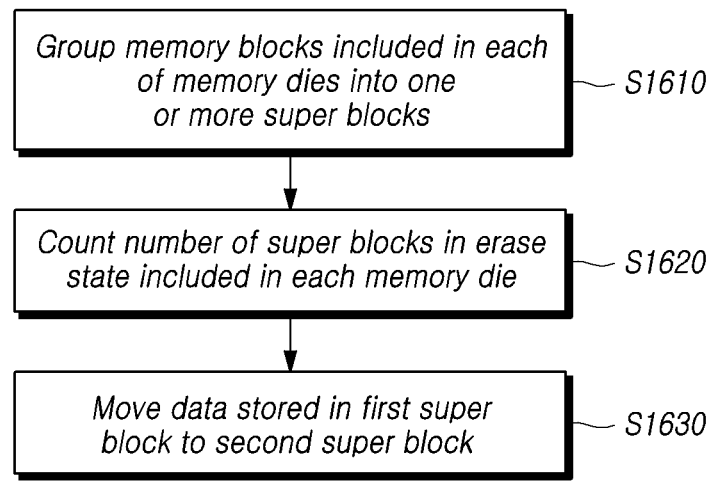
FIG. 16 illustrates an operating method of a memory system according to embodiments of the disclosed technology.

FIG. 16 illustrates an operating method of a memory system 100 according to embodiments of the disclosed technology.

Referring to FIG. 16, an operating method of a memory system 100 may include grouping a plurality of memory blocks BLK included in each of a plurality of memory dies DIE—each memory die DIE includes a plurality of memory blocks BLK—into one or more super blocks SB (S1610).

The operating method of a memory system 100 may include counting the number of super blocks in an erase state included in each memory die (S1620).

In addition, the operating method of a memory system 100 may include moving data stored in a first super block 1st_SB included in a first memory die 1st_DIE having the smallest number of super blocks in the erase state among the plurality of memory dies DIE to a second super block 2nd_SB included in a second memory die 2nd_DIE having the largest number of super blocks in the erase state among the plurality of memory dies DIE (S1630).

In S1630, the first super block 1st_SB may be determined as a super block having the smallest erase count among super blocks in a write state included in the first memory die 1st_Die.

In S1630, the second super block 2nd_SB may be determined as a super block having the largest erase count among the super blocks in the erase state included in the second memory die 2nd_Die.

In addition, in S1630, when a difference between the number of super blocks in the erase state included in the first memory die 1st_DIE and the number of super blocks in the erase state included in the second memory die 2nd_DIE is greater than or equal to a set threshold THR, the data stored in the first super block 1st_SB may be moved to the second super block 2nd_SB.

The operating method of a memory system 100 may further include allocating the super blocks SB included in the plurality of memory dies DIE to the plurality of zones.

The operating method of a memory system 100 may further include allocating one or more of the super blocks SB included in the plurality of memory dies DIE to the target zone ZONE_T among the plurality of zones ZONE.

In this case, allocating one or more of the super blocks SB included in the plurality of memory dies DIE to the target zone ZONE_T may be performed when the target zone ZONE_T is activated.

Allocating one or more of the super blocks SB included in the plurality of memory dies DIE to the target zone ZONE_T may include selecting a memory die in a round robin manner from among a plurality of memory dies DIE, and allocating one or more of the super blocks SB included in the selected memory die to the target zone ZONE_T.

The operating method of a memory system 100 may further include resetting the target zone ZONE_T.

In this case, resetting the target zone ZONE_T may include erasing data stored in the super blocks SB allocated to the target zone ZONE_T.

In addition, resetting the target zone ZONE_T may include releasing super blocks SB allocated to the target zone ZONE_T.

Further, resetting the target zone ZONE_T may include deactivating the target zone ZONE_T.

The operating method of a memory system 100 may further include, when the difference between the number of super blocks in the erase state included in the first memory die 1st_Die and the number of super blocks in the erase state included in the second memory die 2nd_Die is greater than or equal to the set threshold THR, moving the data stored in the first super block 1st_SB to the second super block 2nd_SB.

Figure 17:
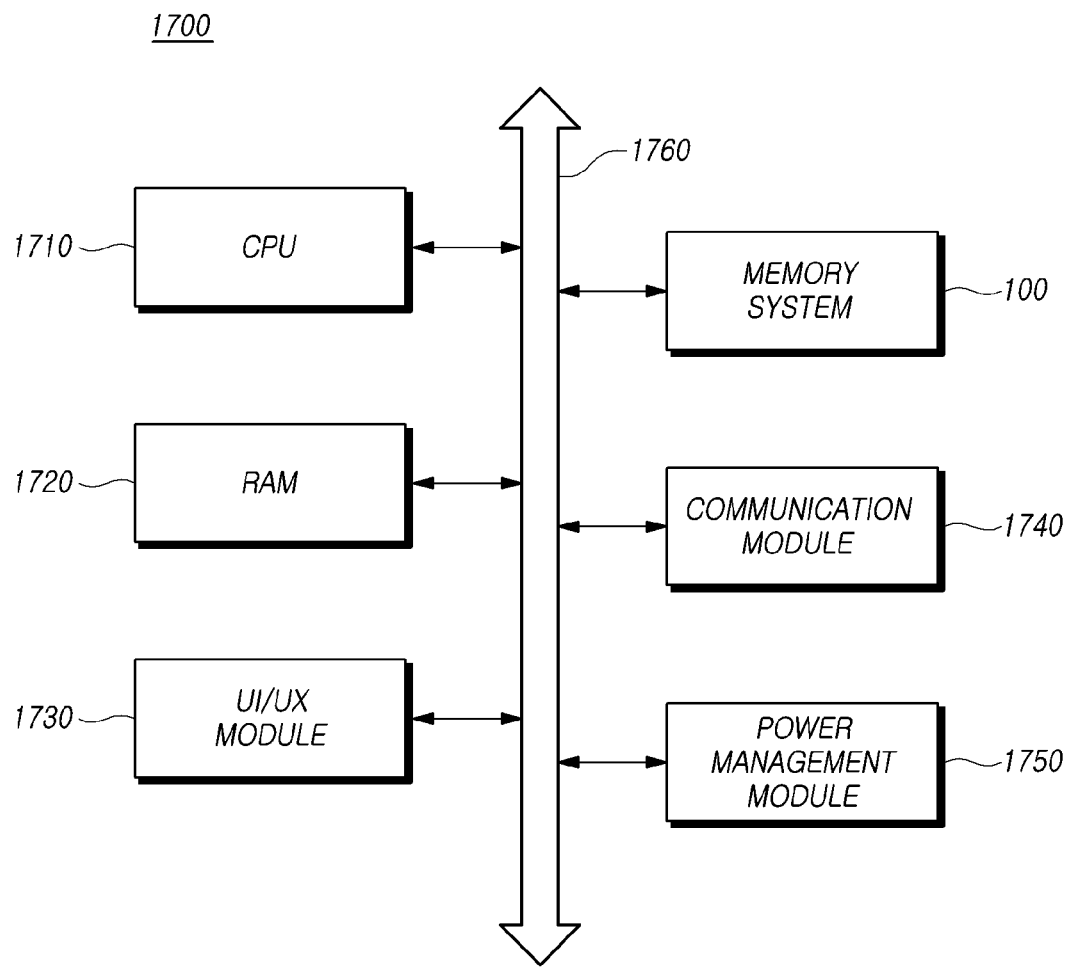
FIG. 17 is a diagram illustrating the configuration of a computing system based on some embodiments of the disclosed technology.

FIG. 17 is a diagram illustrating the configuration of a computing system 1700 based on an embodiment of the disclosed technology.

Referring to FIG. 17, the computing system 1700 based on an embodiment of the disclosed technology may include: a memory system 100 electrically connected to a system bus 1760; a CPU 1710 configured to control the overall operation of the computing system 1700; a RAM 1720 configured to store data and information related to operations of the computing system 1700; a user interface/user experience (UI/UX) module 1730 configured to provide the user with a user environment; a communication module 1740 configured to communicate with an external device as a wired and/or wireless type; and a power management module 1750 configured to manage power used by the computing system 1700.

The computing system 1700 may be a personal computer (PC) or may include a mobile terminal such as a smartphone, a tablet or various electronic devices.

The computing system 1700 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in this patent document.

What is claimed is:

1. A memory system comprising:
a memory device including a plurality of memory dies, each of the plurality of memory dies including a plurality of memory blocks for storing data and different groups of memory blocks form one or more super blocks; and
a memory controller in communication with the memory device and configured to,
(1) count the number of super blocks in an erase state included in each memory die,
(2) identify a first memory die having the smallest number of super blocks in the erase state and a second memory die having the largest number of super blocks in the erase state,
(3) determine one of super blocks included in the first memory die as a first super block and one of super blocks included in the second memory as a second super block, and (4) move data stored in the first super block included in the first memory die to the second super block included in the second memory die,
wherein the memory controller is configured to move data stored in the first super block to the second super block in case that a difference between the number of super blocks in the erase state included in the first memory die and the number of super blocks in the erase state included in the second memory die is greater than or equal to a set threshold,
wherein the memory controller is further configured to allocate super blocks included in the plurality of memory dies to a plurality of zones defined based on logical addresses corresponding to the plurality of zones, and
wherein a garbage collection operation is not performed on the plurality of zones.

2. The memory system of claim 1, wherein the memory controller is further configured to determine the first super block as a super block having the smallest erase count among super blocks in a write state included in the first memory die.

3. The memory system of claim 1, wherein the memory controller is further configured to determine the second super block as a super block having the largest erase count among super blocks in the erase state included in the second memory die.

4. The memory system of claim 1, wherein the memory controller is further configured to activate a target zone among the plurality of zones, to which data is to be written, and allocate one or more of super blocks included in the plurality of memory dies to the target zone.

5. The memory system of claim 4, wherein the memory controller is further configured to select a memory die from among the plurality of memory dies in a round-robin manner, and allocate one or more of the super blocks included in the selected memory die to the target zone.

6. The memory system of claim 4, wherein the memory controller is further configured to reset the target zone by erasing the data stored in super blocks allocated to the target zone, releasing super blocks allocated to the target zone, and deactivating the target zone.

7. The memory system of claim 6, wherein the memory controller is further configured to move the data stored in the first super block to the second super block after resetting the target zone, the moving of the data occurs in case that a difference between the number of super blocks in the erase state included in the first memory die and the number of super blocks in the erase state included in the second memory die is greater than or equal to a set threshold, data stored in the first super block to the second super block.

8. An operating method of a memory system, the method comprising:
counting the number of super blocks in an erase state included in each memory die;
identifying a first memory die having the smallest number of super blocks in the erase state and a second memory die having the largest number of super blocks in the erase state;
determining one of super blocks included in the first memory die as a first super block and one of super blocks included in the second memory as a second super block; and
moving data stored in the first super block included in the first memory die to the second super block included in the second memory die, and
allocating super blocks included in the plurality of memory dies to a plurality of zones defined based on logical addresses corresponding to the plurality of zones,
wherein the moving of data stored in the first super block to the second super block is performed when a difference between the number of super blocks in the erase state included in the first memory die and the number of super blocks in the erase state included in the second memory die is greater than or equal to a set threshold, and
wherein a garbage collection operation is not performed on the plurality of zones.

9. The operating method of claim 8, further comprising:
determining the first super block as a super block having the smallest erase count among super blocks in a write state included in the first memory die.

10. The operating method of claim 8, further comprising:
determining the second super block as a super block having the largest erase count among super blocks in the erase state included in the second memory die.

11. The operating method of claim 8, further comprising:
allocating super blocks included in a plurality of memory dies including the first memory die and the second memory die to a plurality of zones defined based on logical addresses corresponding to the plurality of zones.

12. The operating method of claim 11, further comprising:
activating a target zone among the plurality of zones; and
allocating one or more of super blocks included in the plurality of memory dies to the target zone.

13. The operating method of claim 12, wherein the allocating of the one or more of super blocks comprises:
selecting a memory die from among the plurality of memory dies in a round robin manner; and
allocating one or more of super blocks included in the selected memory die to the target zone.

14. The operating method of claim 12, further comprising resetting the target zone,
wherein the resetting of the target zone comprises:
erasing data stored in super blocks allocated to the target zone;
releasing the super blocks allocated to the target zone; and
deactivating the target zone.

15. The operating method of claim 14, wherein the data moves from the first super block to the second super block after resetting the target zone, the moving of the data occurs when a difference between the number of super blocks in the erase state included in the first memory die and the number of super blocks in the erase state included in the second memory die is greater than or equal to a set threshold, data stored in the first super block to the second super block.

16. The memory system of claim 1, wherein the memory controller is configured to move data stored in the first super block to the second super block by erasing the data from the first super block and writing the data in the second super block.

17. The operating method of claim 8, wherein the moving data stored in the first super block to the second super block comprises:
erasing the data from the first super block; and
writing the data in the second super block.

* * * * *